United States Patent [19]

Sagaser et al.

[11] 4,169,513
[45] Oct. 2, 1979

[54] SIGNAL ACTUATING DEVICE

[75] Inventors: Thomas M. Sagaser, Gwinner; Dale P. Bodine, Lisbon, both of N. Dak.

[73] Assignee: Clark Equipment Company, Buchanan, Mich.

[21] Appl. No.: 889,784

[22] Filed: Mar. 24, 1978

[51] Int. Cl.² ............................................. B60K 28/00
[52] U.S. Cl. .................................. 180/271; 74/471 R; 74/479; 74/491; 180/6.48; 180/77 R; 200/61.85; 340/91
[58] Field of Search .................. 180/6.48, 77 R, 82 R; 340/84, 87, 91; 200/50 C, 61.85; 74/479, 480 R, 491, 471 R

[56] References Cited

U.S. PATENT DOCUMENTS

| 3,024,858 | 3/1962 | Davis | 180/6.48 |
| 3,181,389 | 5/1965 | Richard | 180/6.48 |
| 3,605,519 | 9/1971 | Heggen | 180/6.48 X |
| 4,043,416 | 8/1977 | Albright et al. | 180/6.48 |
| 4,063,217 | 12/1977 | Hyde | 200/61.85 X |
| 4,090,411 | 5/1978 | Albright et al. | 180/6.48 X |

Primary Examiner—George E. A. Halvosa
Attorney, Agent, or Firm—Ernst H. Ruf

[57] ABSTRACT

A signal actuating device is provided for vehicles of the skid-steer type. The actuating device includes a summing bar that mechanically sums the positions of two manual control bars and that actuates a switch to warn pedestrians when the vehicle is backing up or doing other maneuvers that are potentially dangerous to pedestrians.

14 Claims, 6 Drawing Figures

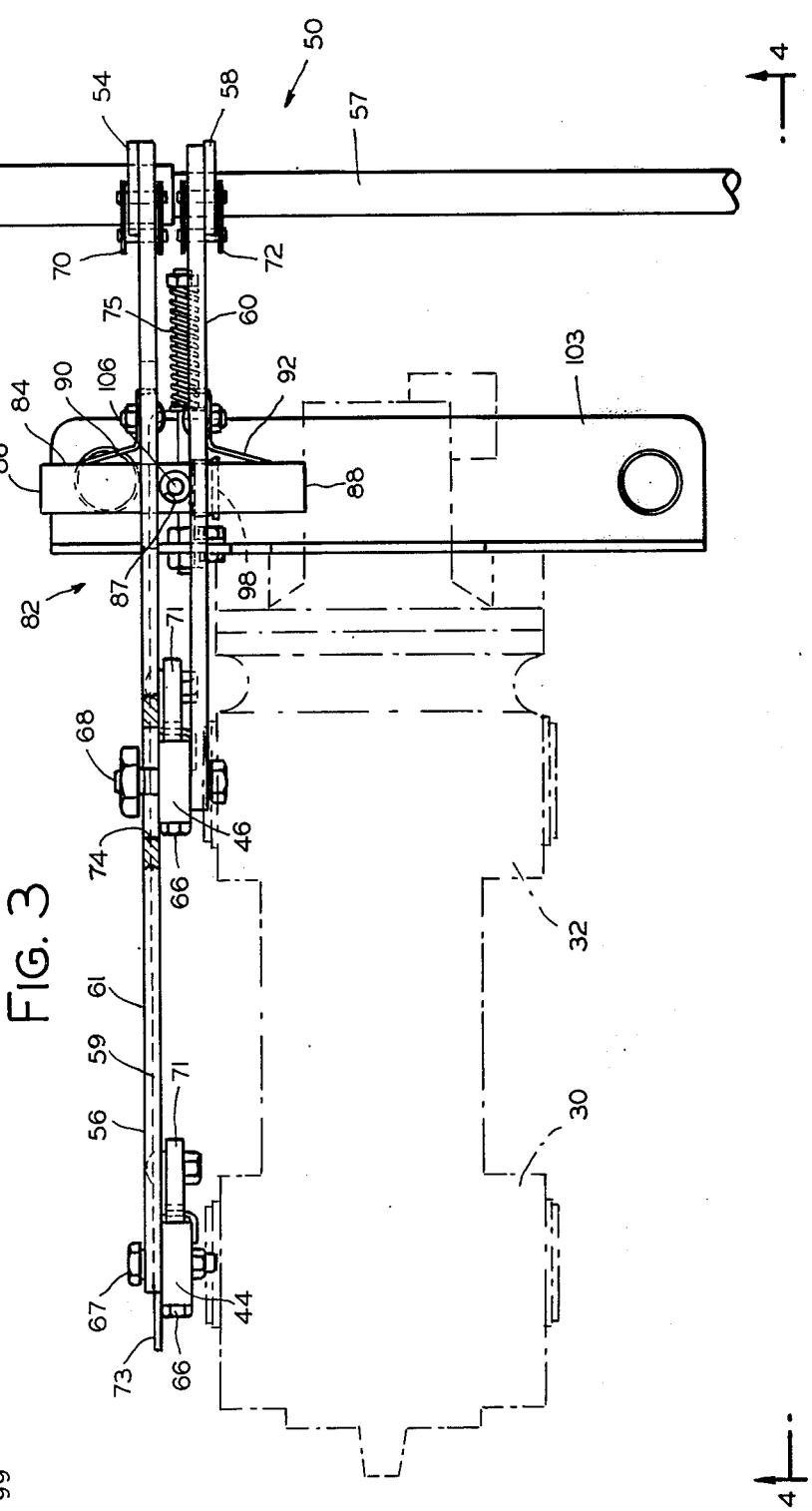
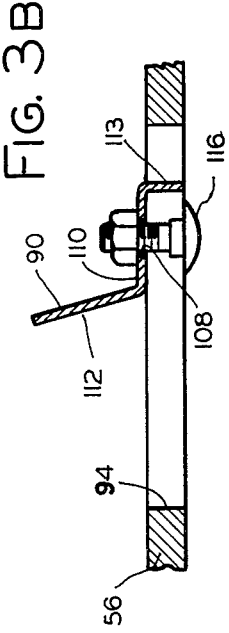
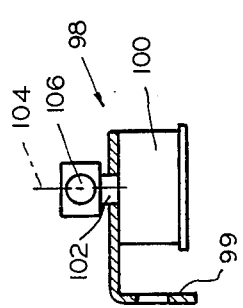

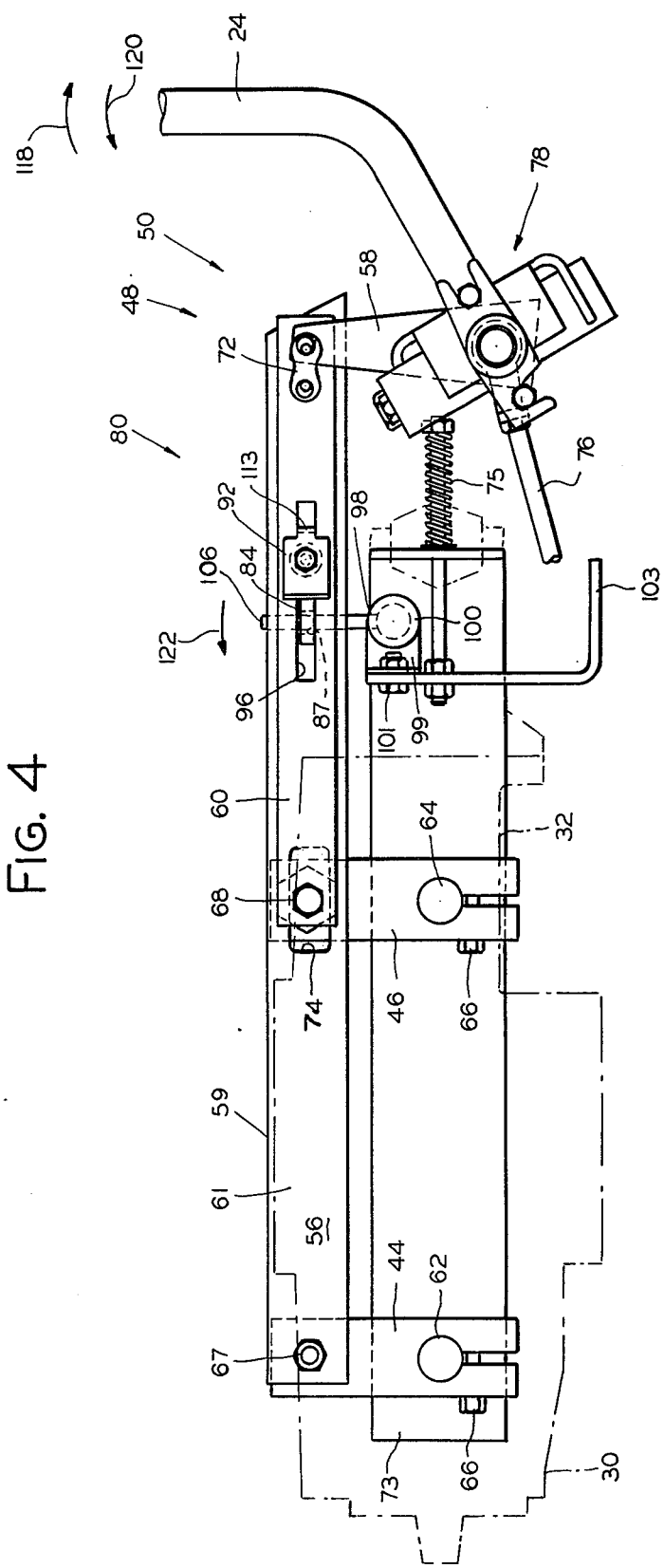

SIGNAL ACTUATING DEVICE

BACKGROUND OF THE INVENTION

1. Field of the Invention

The present invention relates generally to signalling devices for vehicles of the type in which steering is accomplished by varying the speed and/or reversing the rotation of wheels or other propelling elements on separate sides of the vehicle, and more particularly to a signal actuating device for hydrostatically propelled vehicles of the skid-steer type.

2. Description of the Prior Art

The prior art includes Albright et al., U.S. Pat. No. 4,043,416, of common assignee, that discloses both the general vehicle and the mechanical elements thereof that cooperate with elements of the present invention.

SUMMARY OF THE INVENTION

In accordance with the broader aspects of this invention, there is provided a signal actuating device for a vehicle of the type having left and right rotary propelling elements that preferably comprise wheels and that are proximal to opposite sides of the vehicle, a source of power that preferably comprises an internal combustion engine, means, which preferably comprises hydrostatic propulsion units, for supplying power to the propelling elements or wheels, and first and second manual control devices that preferably comprise first and second manual control levers or hand levers, and that are connected to the means for supplying power. The first and second manual control devices control both the direction of rotation and the rotational speed of respective ones of the rotary propelling elements in response to the direction of movement and the magnitude of movement of manual control signals that are applied to respective ones of the hand levers, thereby selecting forward or reverse motion, selecting speed of motion, and providing steering control.

The first and second manual control devices, in addition to the manual control levers, include a pair of spaced-apart control bars that connect the manual control levers to the hydrostatic propulsion units.

The signal actuating device includes a summing bar that senses and sums the respective positions of the control bars, and an electrical switch that is actuated in accordance with the summed positions of the control bars.

It is a first object of the present invention to provide a signal actuating device for vehicles of the type wherein steering is achieved by separately varying the speed and/or the direction of propulsion of opposite sides of a vehicle.

It is a second object of the present invention to provide a signal actuating device for hydrostatically propelled vehicles of the type wherein steering is achieved by separately varying the speed and/or direction of rotation of fluid motors that provide propulsion power to opposite sides of the vehicle.

It is a third object of the present invention to provide a signal actuating device which mechanically senses and mechanically sums parameters that are indicative of the direction of rotation and rotational speed of propelling devices on opposite sides of a vehicle and which actuates a switch or other device according to predetermined conditions of rotational direction and speed.

It is a fourth object of the present invention to provide a signal actuating device which comprises a transversely disposed summing bar that senses the positions of two parallel disposed control bars and that actuates a switch or other device according to predetermined combinations of locations of the control bars.

These and other advantages and objects of the present invention will be readily apparent when referring to the following detailed description wherein:

BRIEF DESCRIPTION OF THE DRAWINGS

FIG. 3 is a top view of a portion of the manual control devices with the tandem pumps of the hydrostatic propulsion unit shown in phantom lines, taken substantially as shown in the schematic drawing of FIG. 2;

FIG. 3A is a partial and enlarged view of FIG. 3, showing the maneuver signalling switch and mounting bracket thereof;

FIG. 3B is a partial and enlarged view of FIG. 3, showing a portion of one of the control bars and one of the actuating cams; and FIG. 4 is a side elevation of a portion of the manual control devices with the tandem pumps of the hydrostatic propulsion unit shown in phantom lines, taken substantially as shown by view line 4—4 of FIG. 3.

DESCRIPTION OF THE PREFERRED EMBODIMENT

Figure 1:
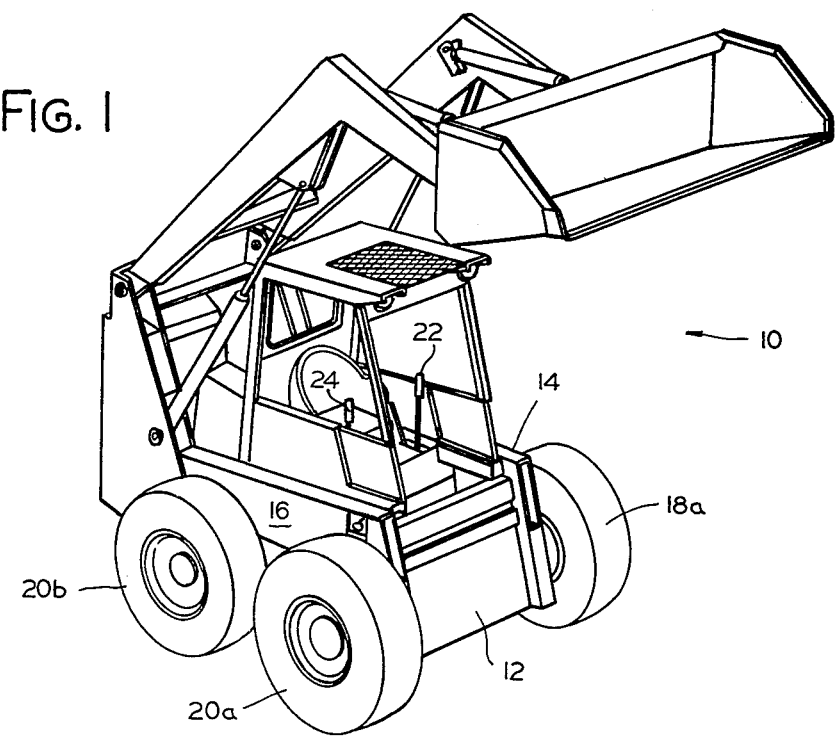
FIG. 1 is a perspective view of a mobile shovel loader of the wheeled skid-steer type which is described for use with, and as a part of, the present invention.

Referring now to FIG. 1, vehicle 10 includes a frame 12 having a first side 14 and a second side 16, first and second rotary propelling elements or wheels 18a and 20a, and first and second manual control levers or hand levers, 22 and 24.

Figure 2:
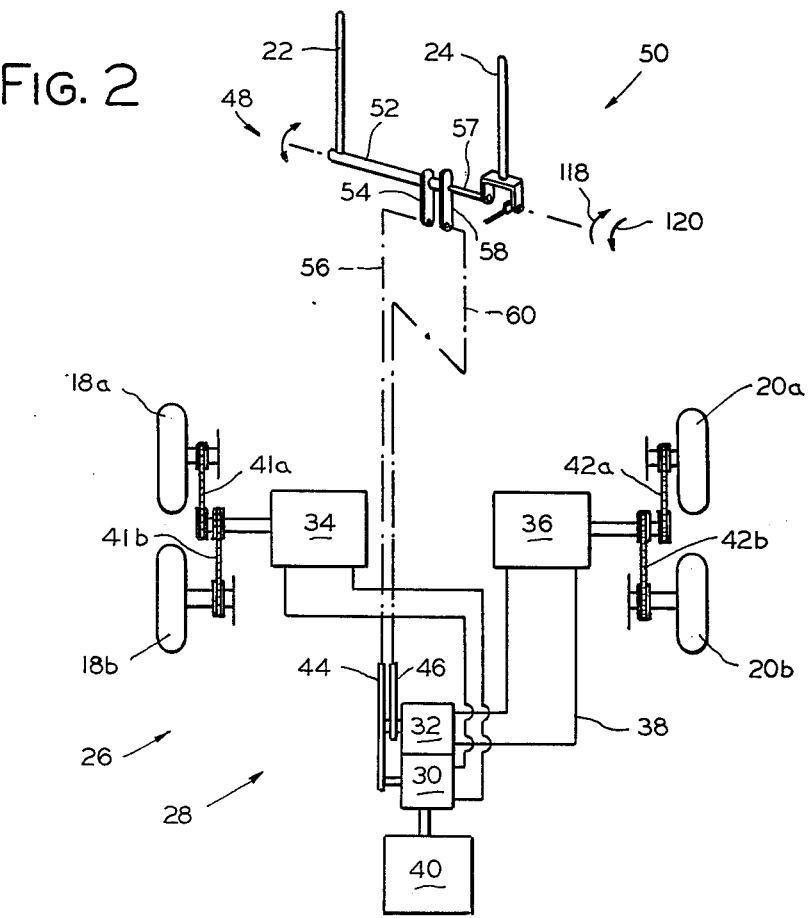
FIG. 2 is a schematic view of the hydrostatic propulsion system and manual control devices for the vehicle of FIG. 1, taken substantially as a top elevation, but with a portion of the manual control devices shown in perspective for better clarity.

Referring now to FIG. 2, vehicle 10 of FIG. 1 includes a hydrostatic propulsion system 26 which includes a tandem pump 28 having a first variable and reversible flow fluid pump 30 and a second variable and reversible flow fluid pump 32 and which includes both a first fluid motor 34 and a second fluid motor 36 that are connected to respective ones of the pumps 30 and 32 by conduits 38. Tandem pump 28 is connected to and driven by a source of mechanical power 40 which preferably comprises an internal combustion engine. The fluid motor 34 drives the wheel 18a by a chain 41a and a wheel 18b is driven by a motor 34 and a chain 41b. In like manner, the fluid motor 36 drives the wheel 20a by a chain 42a and drives a wheel 20b by a chain 42b.

The pumps 30 and 32 are of the axial piston type in which both the displacement and direction of fluid flow are controlled by manually positioning a swash plate (not shown) that controls the stroke of the pistons (not shown). This type of pump is well-known in the art and does not constitute a part of the present invention. In FIG. 2, bell cranks 44 and 46 are schematically illustrated as the mechanical means for controlling the angular positions of the swash plates (not shown).

Referring again to FIG. 2, vehicle 10 of FIG. 1 includes a first manual control device 48 and a second manual control device 50. The manual control device 48 includes the manual control lever or hand lever 22, a torque shaft or torque tube 52, a bell crank 54, an elongated control bar 56 which is symbolically illustrated by a phantom line in FIG. 2 and which is shown in FIGS. 3 and 4, and the bell crank 44. In like manner, the second manual control device 50 includes the control lever 24, a torque shaft or torque tube 57, a bell crank 58, an elongated control bar 60 which is illustrated by a phantom line in FIG. 2 and which is shown in detail in FIGS. 3 and 4, and the bell crank 46.

Referring now to FIGS. 3 and 4, the variable and reversible flow fluid pumps 30 and 32 of the tandem pump 28 are shown in phantom lines with the exception of swash plate shafts 62 and 64 which are shown by solid lines. The bell cranks 44 and 46 are positioned in upstanding directions and are clamped to respective ones of the swash plate shafts 62 and 64 by bolts 66. The first elongated control bar 56 is connected to the bell crank 44 distal from the swash plate shaft 62 by a bolt 67; and the elongated control bar 60 is connected to the bell crank 46 distal from the swash plate shaft 64 by a bolt 68. The control bar 56 is also connected to the bell crank 54 by links 70 and the control bar 60 is connected to the bell crank 58 by links 72.

The control bars 56 and 60 are preferably of substantially rectangular cross-sections, each having a pair of narrow sides 59 and each having a pair of wide planar sides 61. The control bar 56 includes a slot 74 that allows the control bar 56 to move independently of the control bar 60 even though the bolt 68 projects through the control bar 56.

The preceding elements are explained in greater detail in U.S. Pat. No. 4,043,416 of common assignee which is included in the present specification by reference herein thereto. Lugs 71, bracket 73, and spring 75 which cooperate to provide a centering force for the swash plate shafts 62 and 64, and the interconnection of the control lever 24 and the torque tube 57 which includes a push rod 76 and which is generally depicted at 78, do not form a part of the present invention and so are not described herein.

Referring now to FIGS. 3, 3A, 3B, and 4, a signal actuating device 80 includes the manual control devices 48 and 50 which in turn include respective ones of the control levers 22 and 24 (FIGS. 1 and 2), the torque tubes 52 and 57, the bell cranks 54 and 58, the control bars 56 and 60, and the bell cranks 44 and 46.

The signal actuating device 80 further includes a switch actuator means 82 which comprises a summing bar 84 having ends 86 and 88 and having a hole 87 intermediate of the ends 86 and 88, a first actuating cam 90, a second actuating cam 92, hole or elongated slot 94 in the control bar 56, and an identical hole or elongated slot 96 in the control bar 60.

The signal actuating device 80 further comprises a mechanically actuated signalling switch or maneuver signalling switch 98 having a switch body 100, having a rotary actuating shaft 102 that is mounted in the switch body 100 for rotation about an actuating shaft axis 104, and having a switch actuating lever 106 which is secured to the rotary actuating shaft 102. The switch 98 includes a bracket 99 and a bolt 101 secures the switch 98 to a structural angle 103, the switch 98 being positioned with the actuating lever 106 extending upwardly through the hole 87 of the summing bar 84.

The cams 90 and 92 are each made from a substantially rectangular strip of sheet metal and each includes a hole 108 in a mid portion 110, a camming portion 112 that is bent outwardly, and a reduced width portion or tang 113 that is bent inwardly to engage a respective one of the elongated slots 94 and 96. Thus the cams 90 and 92 can be moved longitudinally, and can be secured by bolts 116, to engage the summing bar 84 at predetermined positions of the control bars 56 and 60, engaging the switch actuating lever 106 by the periphery of the hole 87 in the summing bar 84, through which the switch actuating lever 106 extends.

Referring now to FIGS. 2, 3, and 4, in operation, the levers 22 and 24 are actuated in the direction of arrow 118 to actuate the bell cranks 44 and 46 to a position that inclines the swash plate shafts 62 and 64 for forward propulsion of the vehicle 10. At this time, the length and position of the elongated slots 94 and 96 allow movement of the control bars 56 and 60 without interaction between the slots 94 and 96 and the summing bar 84. When the control levers 22 and 24 are moved in the direction of an arrow 120, the swash plate shafts 62 and 64 are positioned to reverse the flow of fluid from the pumps 30 and 32 to respective ones of the motors 34 and 36, rotating the wheels 18a and 20a in the reversedirection. At this time, the actuating cams 90 and 92 engage the summing bar 84 intermediate of the hole 87 and respective ones of the ends 86 and 88 of the summing bar 84, rotating the switch actuating lever 106 in the direction of an arrow 122 and closing an electrical contact (not shown) in the switch body 100.

Since the summing bar 84 is effective to sum the mechanical movements of the control bars 56 and 60, it can be seen that the actuating cams 90 and 92 can be positioned with respective ones of the bolts 116 to actuate the switch 98 under predetermined conditions of backing or backward turns.

While only a single embodiment of the present invention has been described in detail, it will be understood that the detailed description is intended to be illustrative only and that various modifications and changes may be made to the present invention without departing from the spirit and scope of it. Therefore the limits of the present invention should be determined from the attached claims.

What is claimed is:

1. In a vehicle of the type having first and second rotary propelling elements that are proximal to opposite sides of said vehicle, having a source of power, having means for supplying said power to said propelling elements, and having first and second manual control devices that are connected to said power supplying means, and that control the direction of rotation and the rotational speed of respective ones of said rotary propelling elements in response to the direction of movement and magnitude of movement of manual control signals applied to respective ones of said manual control devices, the improvement which comprises:

a mechanically actuated signalling switch being mechanically attached to said vehicle; and switch actuator means for receiving mechanical motion from both of said manual control devices, and for actuating said switch as a function of the sum of said magnitudes of movement when both of said movements are in the same direction.

2. A vehicle as claimed in claim 1 in which said switch actuator means actuates said switch as a function of said magnitude of movement of the one of said manual control devices moving in one of said directions less said magnitude of movement of the other of said manual control devices in the other of said directions.

3. A vehicle as claimed in claim 1 in which said manual control devices comprise a pair of elongated control bars that are disposed substantially parallel to each other, and that are spaced apart from each other;

said switch actuator means comprises summing bar means, having first and second ends, being operatively connected to said switch intermediate of said ends, and being operatively connected to respective ones of said control bars intermediate of said connection to said switch and respective ones of said ends, for receiving said movements from said control bars, and for actuating said switch as said function of said sums of said magnitudes of said movements.

4. A vehicle as claimed in claim 3 in which said switch includes a switch body, a rotary actuating shaft that is carried in said switch body and that rotates about an actuating shaft axis, and a switch actuating lever that is attached to said actuating shaft and that extends orthogonally outward from said shaft axis;

said actuating shaft axis is orthogonal to said elongations of said control bars and is substantially equidistant from both of said control bars; and said operative connection of said summing bar to said switch comprises engagement of said summing bar with said switch actuating lever.

5. A signal actuating device for a hydrostatically propelled vehicle of the type having first and second rotary propelling elements that are proximal to opposite sides of said vehicle, having first and second fluid motors that are operatively connected to respective ones of said rotary propelling elements, having first and second variable and reversible flow fluid pumps that are connected to respective ones of said fluid motors, having a source of mechanical power that is connected to said pumps, and having first and second manual control devices that are connected to respective ones of said pumps and that control the direction and magnitude of fluid flow from respective ones of said pumps to respective ones of said fluid motors in response to the direction of movement and magnitude of movement of respective ones of said manual control devices, wherein said actuating device comprises:

a maneuver signalling switch being mechanically attached to said vehicle; and switch actuator means for receiving mechanical motion from both of said control devices, and for actuating said switch as a function of the sum of said magnitudes of movement when both of said movements are in the same direction.

6. A signal actuating device as claimed in claim 5 in which said switch actuator means actuates said switch as a function of said magnitude of movement of the one of said manual control devices moving in one of said directions less said magnitude of movement of the other of said manual control devices in the other of said directions.

7. A signal actuating device as claimed in claim 5 in which said manual control devices comprise a pair of elongated control bars that are disposed substantially parallel to each other, and that are spaced apart from each other;

said switch actuator means comprises summing bar means, having first and second ends, being operatively connected to said switch intermediate of said ends, and being operatively connected to respective ones of said control bars intermediate of said connection to said switch and respective ones of said ends, for receiving said movements from said control bars, and for actuating said switch as said function of said sum of said magnitudes of said movements.

8. A signal actuating device as claimed in claim 7 in which said switch includes a switch body, a rotary actuating shaft that extends from said switch body and that rotates about an actuating shaft axis, and a switch actuating lever that is attached to said actuating shaft and that extends orthogonally outward from said shaft axis;

said actuating shaft axis is orthogonal to said elongations of said control bars and is substantially equidistant from both of said control bars; and said operative connection of said summing bar to said switch comprises engagement of said summing bar with said switch actuating lever.

9. A signal actuating device as claimed in claim 8 in which said engagement of said summing bar with said switch actuator lever comprises a hole in said summing bar that engages said switch actuating lever.

10. A signal actuating device as claimed in claim 7 in which said control bars have substantially rectangular cross sections with two wide planar sides and two narrow sides;

one of said wide planar sides of each of said bars is in spaced-apart planar disposition to each other;

said operative connection of said summing bar to said control bars comprises first and second holes through respective ones of said control bars that substantially orthogonally intercept respective ones of said wide planar sides.

11. A signal actuating device as claimed in claim 10 in which said operative connection of said summing bar to said control bars further comprises a first actuating cam being secured to one of said wide planar sides of said elongated first control bar and being longitudinally adjustable with respect to said elongation thereof, and a second actuating cam being secured to one of said wide planar sides of said second control bar and being longitudinally adjustable with respect to said elongation thereof.

12. A signal actuating device as claimed in claim 11 in which said hole in one of said control bars comprises a longitudinally elongated slot; and one of said cams comprises an elongated sheet metal strip having first and second ends, having a bolt hole therethrough intermediate of said ends, being bolted into planar engagement with one of said wide planar surfaces of one of said control bars by a bolt that passes through said bolt hole and through said elongated slot, being bent outwardly from said wide planar surface intermediate of said bolt hole and one of said ends of said strip, being reduced in width at the other of said ends to form a tang, and having said tang bent inwardly into said elongated slot.

13. A signal actuating device as claimed in claim 12 in which each of said pumps includes a swash plate shaft that extends transversely and horizontally out of a respective one of said pumps;

said first and second manual control devices each comprises a bell crank being attached to a respective one of said swash plate shafts, extending upwardly therefrom, and having an upper end that is connected to one of said elongated control bars; and said first and second manual control devices further comprise torque shaft assemblies each having a transversely and horizontally disposed torque shaft, each having a bell crank that extends upwardly from a respective one of said torque shafts and that is operatively connected to one of said control bars, and each having a hand lever that is attached to a respective one of said torque shafts and that extends upwardly therefrom.

14. A signal actuating device as claimed in claim 13 in which said switch includes a switch body, a rotary actuating shaft that extends from said switch body and that rotates about an actuating shaft axis, and a switch actuating lever that is attached to said actuating shaft and that extends orthogonally outward from said shaft axis;

said actuating shaft axis is orthogonal to said elongation of said control bars and is substantially equidistant from both of said control bars; and said operative connection of said summing bar to said switch comprises a hole in said summing bar that engages said switch actuating lever.

* * * * *